Oct. 31, 1967 P. VANDEN BOSCH 3,349,435
PRECISION DIE FOR MANUFACTURE OF FOAMED PLASTICS AND THE LIKE
Filed Sept. 21, 1965 3 Sheets-Sheet 1

INVENTOR
PETER VANDEN BOSCH
BY John J. Rogers
ATTORNEY

Oct. 31, 1967          P. VANDEN BOSCH                3,349,435
PRECISION DIE FOR MANUFACTURE OF FOAMED PLASTICS AND THE LIKE
Filed Sept. 21, 1965                                3 Sheets-Sheet 3
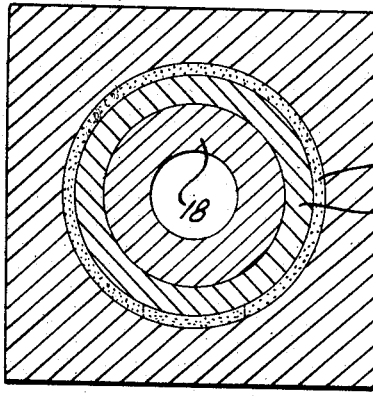
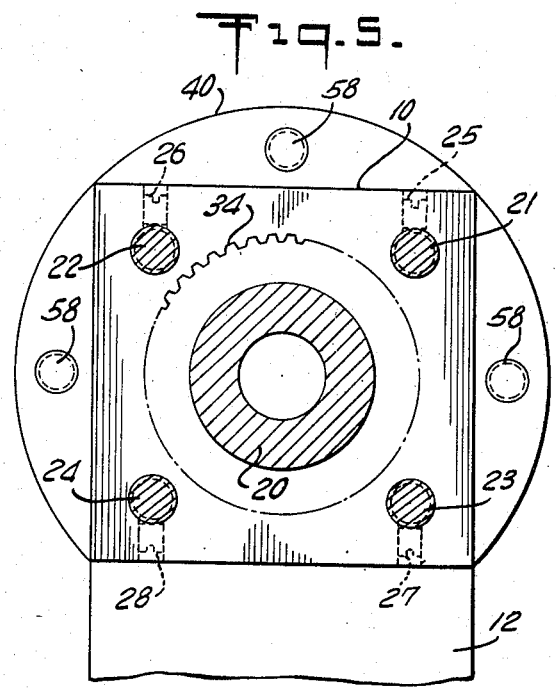
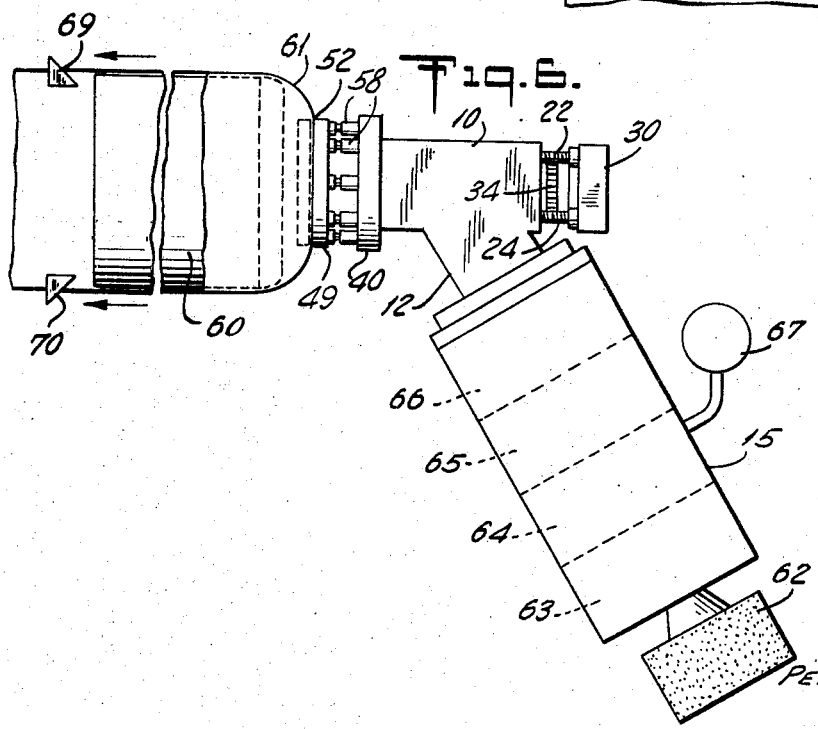
INVENTOR
PETER VANDEN BOSCH ly important that the individual
United States Patent Office 3,349,435
Patented Oct. 31, 1967

3,349,435
PRECISION DIE FOR MANUFACTURE OF FOAMED PLASTICS AND THE LIKE
Peter Vanden Bosch, Waldwick, N.J., assignor to Danadyne, Inc., Linden, N.J., a corporation of New York
Filed Sept. 21, 1965, Ser. No. 488,843
10 Claims. (Cl. 18—14)

This invention relates to the extrusion art and more particularly to the art of manufacturing extruded plastic sheets.

A principal object of the invention is to provide an improved die for the manufacture of foamed plastic sheets and the like.

The invention is in the nature of an improvement on the die disclosed in my co-pending application entitled "Die for Foamable Plastics and the Like," Ser. No. 488,921, filed on even date herewith. There is disclosed in said application a die which is arranged to receive a supply of foamable plastic under pressure from any well-known extruding machine, so as to produce at the die output mouth an annular sheet-like plastic. In order to achieve the desired surface characteristics, including densification, and cell formation, etc. within the finished sheet, I have found it necessary to provide precise dimensional and temperature controls for the various parts of the die. Thus, according to said co-pending application, the die is constructed so that the extrudate is received under pressure from any well-known extruding machine it is forced under pressure through a tubular passage within the die which passage leads to the annular exit mouth of the die. In other words, the die includes a cylindrical mandrel on its interior which defines a tubular passageway through which the extrudate is conveyed from the extruding machine through an inlet port. Because of the pressure on the extrudate, it is forced around the periphery of the mandrel to form a tubular mass.

I have found with that arrangement, in some cases the incoming plastic mass from the extruding machine may not uniformly distribute itself around the mandrel. For example, since the inlet port to the die is at one side thereof, the incoming extrudate tends to follow more readily the most direct path between the mandrel and the location of the inlet port. This may result in a non-uniform distribution of the extrudate around the mandrel or a non-uniform density of the extrudate around the mandrel. Furthermore, the extrudate in passing around both halves of the mandrel to form the tubular mass, may have a different quantity or density arriving around one peripheral half as compared with that arriving around the other peripheral half, it being necessary that the two halves merge when arriving at their common meeting point around the mandrel. If the quantity or density of the extrudate arriving around both halves of the mandrel is non-uniform, it may show up as a defect in the finished sheet.

Accordingly, it is another principal object of this invention to provide an extruding die especially suited for extruding foamed plastics and the like wherein the plastic under pressure is caused to flow more uniformly around the cylindrical forming mandrel within the die.

A feature of the invention relates to a novel mandrel for dies of the kind used to extrude molten plastic.

Another feature relates to an improved die for controlling the characteristics of extruded foamed plastic sheets.

A still further feature relates to the novel organization, arrangement, and relative location and interconnection of parts which cooperate to provide an improved die for the manufacture of foamed or expanded plastics.

Other features and advantages not specifically enumerated will be apparent after a consideration of the following detailed descriptions and the appended claims.

FIG. 1 of the drawing is a plan view, partly sectionalized, and partly broken away, of a die according to the invention;

FIG. 4 is a sectional view of FIG. 1 taken along the line 4—4 thereof and viewed in the direction of the arrows;

FIG. 5 is a generalized schematic diagram of a plastic sheet-forming system embodying the invention.

Figure 1:
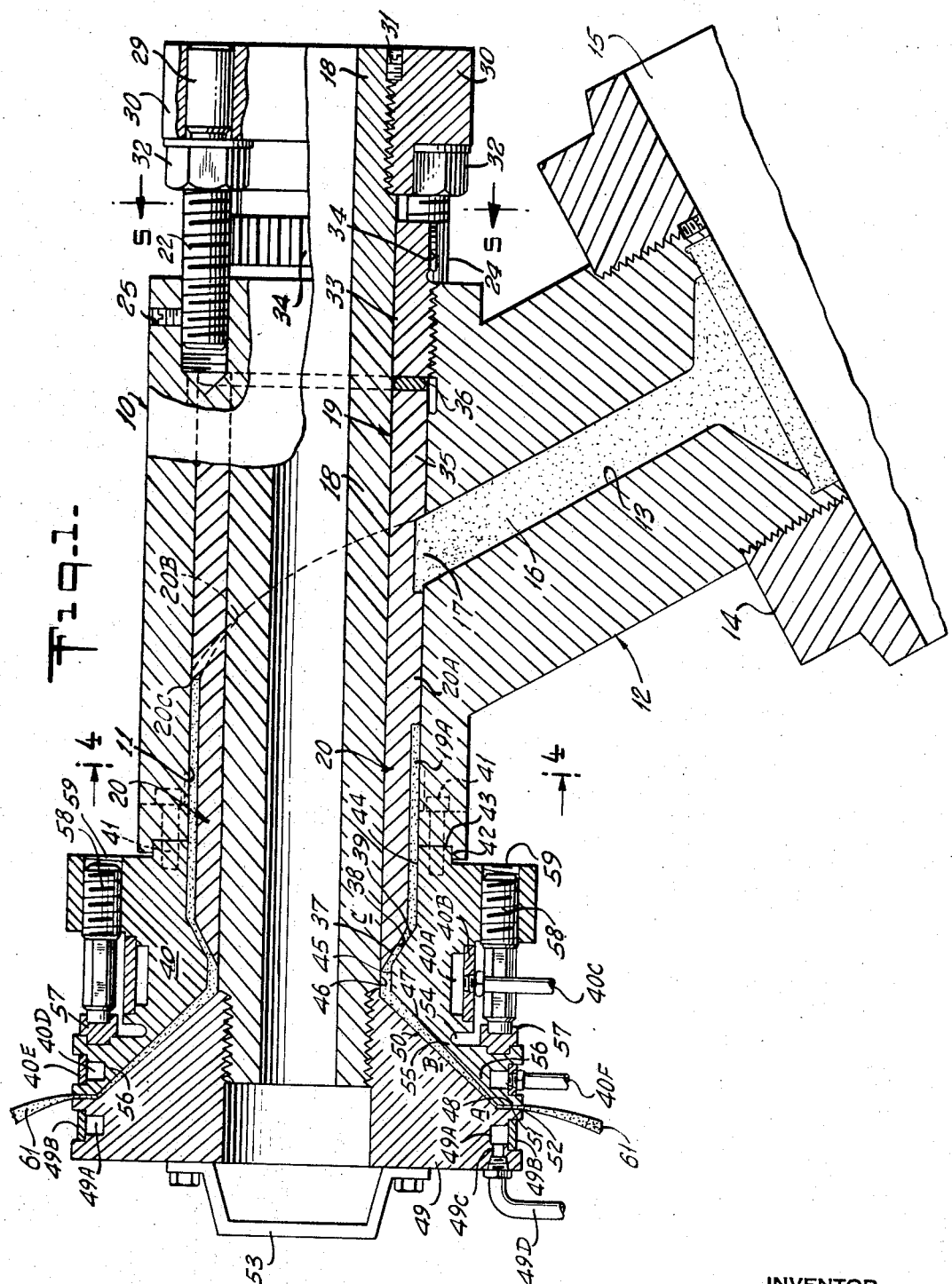

While various forms of extruding apparatus have been heretofore devised, it has been found that in the manufacture of such articles as foamed or expanded plastics, especially in the sheet or film form, very special problems are encountered which are peculiar thereto. Thus it is highly important that the pressure distribution on the extrudate in its passage throughout the die be as uniform as possible, especially where the die receives the extrudate to form it to a tubular mass prior to emergence from the die mouth. It is particular
cells or gas pockets in the finished product be of as uniform size and as uniform distribution as possible throughout the plastic body or sheet. In order to achieve that, and other results, I have found that the die should be of a kind which forms the molten extrudate into a tubular mass within the die and controls the amount and quantity of the tubular mass so as to correlate it with the physical characteristics of the original extrudate as received from the extruding machine and in accordance with the desired physical characteristics of the sheet in its final form. This, it has been found, requires a special design of the die whereby the dimensions of the tubular passageway surrounding the forming mandrel in the die can be controlled and adjusted at a number of points without stopping or otherwise interfering with the continuity of the extrusion operation. These adjustments must also enable the actual emergence mouth of the die to be independently adjusted in accordance with the thickness and other physical characteristics of the emerging extrudate.

In the case of so-called foamable plastics, the extrudate which is fed to the die contains a so-called nucleating agent mixed with the molten plastic which may be any one of the well-known polymerized resins, such for example as polystyrene. The purpose of the nucleating agents is to enable gas pockets to be formed within the extrudate. For example, the nucleating agent may consist of a mixture of sodium bicarbonate, sodium borate and a citric acid. At a suitable stage in the extruding machine to which the die is connected, a suitable gas such as normal pentane can be introduced under a pressure of for example 2000–3000 pounds per square inch.

However, as is well known, the pockets are prevented from expanding in the extruding machine and in the die because of the said high pressure, and it is important that this pressure be maintained on the extrudate even as it is passing to the actual emergence mouth of the die. When the extrudate leaves the die mouth it is merely at atmospheric pressure and the gas pockets are capable of expanding so as to increase the thickness of the plastic sheet by forming a multiplicity of such closed cell or gas pockets within the body of the sheet. At this stage the expanded sheet emerges from the die at a relatively high temperature, for example 220 degrees F. and preferably it is subjected to a curing schedule by passing it over a suitable curing drum such as described for example in application of Thomas M. Britt and Peter Vanden Bosch, Ser. No. 417,332, filed Dec. 10, 1964.

I have disclosed in my co-pending application entitled,

"Apparatus for Extruding Foamed Plastics and the Like" Ser. No. 417,332, filed on even date herewith, and in my co-pending application entitled, "Die for Foamable Plastics and the Like," Ser. No. 488,921 also filed on even date herewith, the novel dimensional and temperature controls in order to achieve the desired characteristics of the extrudate as it emerges from the die. However, I have found that since the extrudate enters the die through a single entrance port, and since it must be shaped to a tubular mass within the die and must be forced around the die mandrel by the extrudate pressure, it is necessary to guide the extrudate around the die mandrel so that it is substantially uniformly distributed and densified therearound and the formation of the tubular mass is free from any non-uniform junctions between the two halves of the mass as they arrive around the respective peripheral halves of the mandrel.

The extruding and sheet-forming die according to the invention comprises a metal casting 10 having a cylindrical bore 11 and formed with an integral angularly extending portion 12 with a central bore 13. Threaded into the inlet end of member 12 is a flange member 14 which enables the die to be fastened in any suitable manner to the outlet end of any well-known plastic extruding machine 15, which delivers in the direction of the arrow a continuous supply of molten foamable plastic 16 under precisely controlled consistency and pressure.

While the invention is not limited to any particular composition of the molten plastic batch, preferably it consists of thermoplastic resin such as polystyrene together with any well-known nucleating agents. In accordance with the invention member 12 is formed so that its bore axis is at less than right angles with respect to the longitudinal axis of the bore 11 of the die for purposes to be described hereinbelow. Preferably that angle should be approximately between 45 degrees and 60 degrees.

Bore 13 communicates with the bore 11 through an entrance port 17. Passing concentrically through the bore of member 10 is a cylindrical metal member 18 whose outer diameter is less than the inside diameter of the bore, thus defining a cylindrical tubular space 19 which is in direct communication with the passage 13. Slidably mounted in the space 19 is a cylindrical metal gauging sleeve and mandrel 20 having a reduced outer diameter at its left-hand portion for purposes to be described hereinbelow. The right-hand end of casting 10 is of square configuration and threaded into the square end of the casting 10 are four adjusting bolts 21–24 which can be locked in adjusted position by respective set screws 25–28. Bolts 21–24 terminate in unthreaded ends 29 which are located within corresponding round openings in a square block 30 which is threaded on the right-hand end of member 18 and locked in place by a set screw 31. The ends 29 are capable of rotation but are anchored aaginst longitudinal movement in block 30. Each bolt 21–24 has affixed thereto a respective bolt-head 32. Thus by loosening the set screws 25–28 and by turning bolts 21–24, the member 18 can be adjusted along the longitudinal axis of the die for purposes to be described hereinbelow.

Adjustably threaded into the square end of casting 10 is a metal sleeve 33 which has fastened to its right-hand end a knurled cap 34 for adjusting the position of the sleeve 33 within the casting. The internal diameter of sleeve 33 is a close sliding fit around the external diameter of member 18. This sliding fit is sufficiently close so that no extrudate can pass between the members 18 and 33, thus defining a tubular cylindrical chamber wherein is slidably positioned the gauging sleeve 20. Sleeve 20 is also a close sliding fit on the external face of sleeve 18. The right-hand end 35 of member 20 is of sufficient thickness so as to provide a close sliding fit between the external face of member 18 and the internal cylindrical bore of member 10. Located between the said right-hand end 35 and the left-hand end of member 33 is a bronze thrust-washer 36. The remaining length of sleeve 20 is of reduced thickness, thus defining a tubular passageway 19A between the sleeve 20 and the internal cylindrical bore 11 of casting 10. The extreme left-hand end of sleeve 20 is tapered as indicated by numeral 37 to define a tapered constricted passage 38 with the corresponding tapered wall 39 of an annular metal block 40.

The gauging sleeve 20 is freely slidable along member 18 and its position towards the right is limited by engagement with the thrust-washer 36. Sleeve 20 is forced towards the right against washer 36 by the pressure of the extrudate 16 which flows through the tubular passageway 19A and engages the tapered end 37 with a component of force sufficient to force the sleeve 20 against washer 36. Therefore by turning member 34, the sleeve 33 can be adjusted towards the right or left, which results in a corresponding change in the width of the constricted passage 38.

Block 40 is generally of annular form and is fastened to the left-hand end of casting 10 by means of four bolts 41. As shown more clearly in FIG. 1, member 40 has a flange 42 which tightly fits within a corresponding recess 43 in the end of casting 10. The portion 44 of member 40 has an inner cylindrical diameter which is the same as the inner diameter of bore 11 in casting 10. The tapered portion 39 of member 40 defines with the tapered face 37, the above mentioned tapered channel 38. Member 40 also has a short cylindrical portion 45 which cooperates with the part 46 of member 18. Member 40 also has a tapered face 47 terminating in an annular flat face 48 at right angles to the longitudinal axis of the die.

The left-hand end of member 18 has threaded thereon an annular metal block 49 which on its right-hand face is formed with an inclined tapered face 50 and with a flat annular face 51. Thus the portion 50 defines with the portion 47 an inclined tapered passage for the extrudate; and the portion 51 forms with the portion 48 an annular emergence mouth 52 for the extrudate. Thus this mouth is constituted of the inner die lip 48 and the outer die lip 51. Fastened to the left-hand end of block 49 is any suitable coupling member 53 for attaching the die to a cylindrical forming unit of any known kind but preferably of the kind disclosed in said application Ser. No. 417,332.

From the foregoing it will be seen that the die is capable of a plurality of individual and discrete adjustments to control the pressure of the extrudate within the die. The maintenance of this pressure is necessary since the expansion of the foamed plastic does not occur until the pressure is released by the emergence of the plastic from the mouth 52 of the die. It has been found that these independent adjustments are necessary so that the expansion characteristics of the foamed plastic, as it leaves the die, may be controlled in accordance with any prescribed schedule. The more critical areas of adjustment are those represented by the letters A, B and C. By turning wheel 34 the position of sleeve 33 and the gauging sleeve 20 can be moved in either direction and thus the spacing between faces 37 and 39 can be correspondingly controlled, it being understood that the member 20 is forced into contact with the thrust-washer 36 by the pressure of the extrudate 16, thus providing the adjustment C. By adjusting the bolts 21–24 the position of sleeve 18 within the bore 11 of the die can be changed, thus changing the spacing between faces 47 and 50 for adjustment B. I have found that the third adjustment, namely adjustment A at the actual emergence mouth 52 can be even fulther precisely controlled. For that purpose, and as shown in FIG. 1, the member 40 is undercut or annularly grooved at the portion 54 leaving a relatively thin flexing portion 55. Thus the left-hand portion 56 of member 40 can be bent towards and away from the faces 50 and 51 enabling micrometer adjustment of the size of the emergence mouth 52 of the die. For that purpose the portion 56 of member 40 has tightly fitted therein an annular bearing ring 57 to receive the rounded ends of a series of eight equally spaced bolts 58. The right-hand end of each of these bolts is threaded in the block 40 and the extreme end of each bolt has a slot 59 so that by turning each such bolt in a clock-wise direction as seen in FIG. 4, the portion 56 is forced to the left to correspondingly reduce the width of the emergence mouth 52. It will be understood, of course, that the member 40 and particularly the portion 56 is of a suitable metal such as steel so that the reduced portion 55 enables the portion 56 to act with sufficient springiness when the corresponding bolts 58 are turned in the opposite or counterclock-wise direction. Thus the portion 56 returns by its springiness to a position determined by the setting of the bolts 58. In other words, the bolts 58 provide a series of independent adjustments around the periphery of the die so as to control the width of the emergence mouth 52 uniformly at a plurality of equally spaced points therearound.

The sleeve 20 is formed with an integral boss 20A (see FIGS. 2 and 3) which is of a generally pear-shaped form with the broad end located symmetrically adjacent the inlet port 17. The bottom face of member 20A is a cylindrical contour so that it fits closely against the cylindrical inner face of bore 11. The maximum width W of boss 20A is much less than the diameter of sleeve 20. The right-hand portion of sleeve 20 as mentioned herein is of a diameter fitting closely the inside diameter of bore 11. In other words, the portion A of sleeve 20 is undercut with respect to the portion B. This undercutting as shown in FIGS. 2 and 3, is curved to provide a curved directionalizing face 20B for the extrudate, which face extends around sleeve 20 with the concave curvature thereof facing towards the left-hand end of the sleeve, as viewed in FIGS. 2 and 3.

Figure 2:
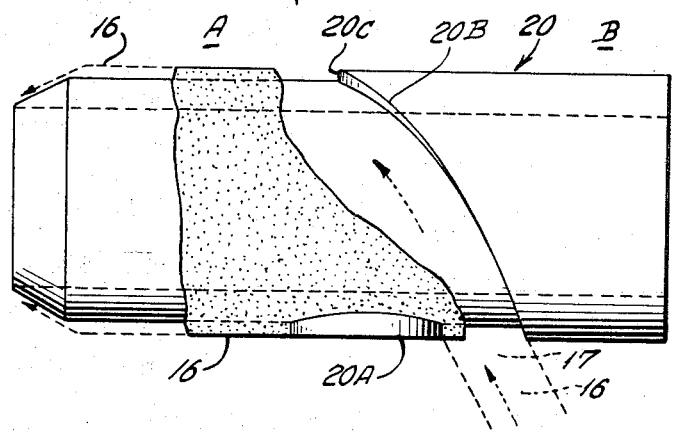
FIG. 2 is a section view taken along line 2—2.

At the bottom of sleeve 20 (as seen in FIG. 2), this undercut portion is spaced from boss 20A a distance D approximating the diameter of the inlet port 17. However, the undercut portion extends symmetrically around sleeve 20 until it terminates in a rounded V-shape end 20C which is symmetrically located with respect to the center line of boss 20A.

Figure 3:
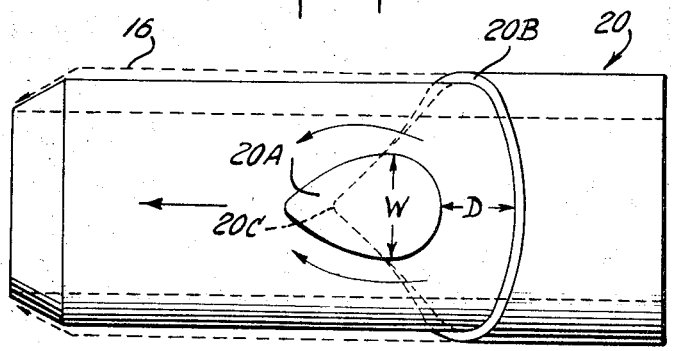
FIG. 3 is a bottom view of FIG. 2.

The face 20B acts in the nature of a smoothly rounded camming surface, so that the extrudate under pressure, when it meets that surface, is forced to divide at the entrance port 17 by reason of the boss 20A, and it is forced to follow two symmetrical paths around the mandrel as indicated by the arrows in FIG. 3 and towards the exit mouth of the die. This guiding action, therefore, results in the two peripheral halves of the tubular extruded mass around the mandrel or sleeve 20 to be of uniform density and equal distribution around the surface of the mandrel.

Furthermore, when the two halves of the extrudate meet around the mandrel they are uniformly bonded at the meeting line. The result of this guiding and camming action is that the tubular extruded mass 16 as it leaves the left-hand end of sleeve 20 has a uniform thickness and is of uniform density with respect to the distribution of the gas pockets within the molten resinous mass.

I have found that not only is it necessary to provide the multiplicity of pressure control adjustments for the extrudate as it is passing through the die but in certain cases it may be necessary to control the temperature at certain critical points within the die, these critical points being namely at the outer lip of the die, at the inner lip of the die, and at the region of the die adjacent the constrictable passage 38. For that purpose the central portion of block 40 is provided with a peripheral groove 40A which is closed off by a sealing ring 40B into which is threaded a fluid inlet pipe 40C. Likewise the portion of block 40 adjacent the inner lip is provided with an undercut groove 40D which is closed off by a sealing ring 40E into which is threaded another fluid inlet pipe 40F. In like manner, the outer lip 51 of the die is provided with an undercut peripheral groove 49A which is closed off by a sealing ring 49B. The groove 49A is provided with an inlet opening 49C into which is threaded a third fluid inlet pipe 49D. Each of the fluid grooves 40A, 40D and 49A can also be provided with respective fluid outlet pipes (not shown) and each outlet pipe can be provided with a respective control valve (not shown) whereby the amount and rate of cooling fluid flowing around each of the die sections can be independently controlled. While the invention is not limited to any particular fluid that is used in the three sections above described, I have found that the best results are achieved if this fluid is a cooling oil or glycol such for example as ethylene glycol. It will be understood, of course, that the temperature of the fluid supplied to each of the three sections may be externally controlled in accordance with the temperature gradient that is desired in the corresponding three sections of the die.

While the die hereinabove described is capable of use in any sheet-forming system, preferably it is used in connection with a forming block 60 such as described in said application Ser. No. 417,332. Thus as shown in FIG. 5, the extruded plastic sheet 61 as it leaves the mouth 52 is in a limp annular form and at this stage the pressure is released allowing the plastic to expand in its thickness by expansion of the multiplicity of gas pockets or cells in the body of the sheet. At this point of emergence the temperature of the extruded sheet 61 is above the final setting or curing temperature of the sheet and it can be drawn in a somewhat cylindrical or balloon shape over the forming block 60 so that while passing in cylindrical form along that block, as indicated by the arrows, it is subjected to a precisely controlled setting temperature gradient. As it leaves the block 60 the cylindrically shaped expanded sheet can be slit into two halves by means of knife edges 69, 70 thus dividing the cylindrical sheet into two separate sheets which are flattened and rolled up on respective reels (not shown) as described in said application Ser. No. 417,332.

From the foregoing it will be seen that the extrudate from the extruding machine 15 enters the port 17 of the die in a non-tubular viscous mass and it is shaped to a cylindrically tubular mass in the die and flows through cylindrical passage 19A and thence radially outward in annular form from the die mouth 52.

While the invention is not limited to any particular extrudate or extruding machine, the invention is specially adapted to extrudates in the form of thermoplastic materials such as polystyrene or other polymerized resin which can be supplied from a suitable hopper 64 in the form of minute pellets or beads having a size for example, of the order of $\frac{1}{16}$ of an inch to $\frac{1}{8}$ of an inch in diameter. In the well-known manner the machine 15 may include the usual extruding barrel and extruding screw (not shown) and may include a series of heated stages 63, 64, 65, 66, wherein the resin beads are transformed into a molten uniform mass. In the well-known manner, some of these stages may constitute compression or compacting stages and are maintained at a suitable temperature to melt the pellets. Likewise in the well-known manner any well-known nucleating material may be introduced into the extruding machine such for example as a mixture of sodium bicarbonate, sodium borate and citric acid. Likewise at one of the stages in the extruder in the well-known manner, a suitable gas such as normal pentane is introduced from a supply 67, under pressure for example of about 2000–3000 pounds per square inch. In such a system it is highly important, therefore, that the pressure on the extrudate be maintained even during its passage through the forming die. The foregoing die with its respective multiple adjustments enables the desired critical control of the pressure to be maintained while at the same time providing for an adjustment of the exit mouth to produce foamed plastic sheets of different thicknesses. For a more detailed description of a typical extruding machine and thermoplastic foamable resin that may be used, reference may be had to said application Ser. No. 417,332.

While one specific embodiment of the invention has been described herein, it will be understood that it is done merely for explanatory purposes and not by way of limitation of its scope. Features disclosed in this application but not claimed herein are claimed in said application Ser. No. 417,332 and in my co-pending application entitled, "Apparatus for Extruding Foamed Plastics and the Like," filed on even date herewith, and in my co-pending application entitled "Die for Foamable Plastics and the Like" (Ser. No. 488,921) also filed on even date herewith.

What is claimed is:

1. Apparatus for forming plastic sheets comprising a die having an inlet port to receive molten plastic extrudate under pressure, an exit die mouth, said die having in its interior a mandrel for forming the said extrudate into a tubular mass, an annular block disposed adjacent one end of said mandrel for cooperating with said one end to control the flow of said extrudate between said block and said one end, said block further having an inwardly extending annular ridge, a generally cylindrical member in said die, said member having a surface spaced from the surface of said ridge to form a tubular passageway therewith through which said extrudate flows during its travel to said die mouth, an extrudate guide means disposed substantially coaxially with the mandrel to guide the molten extrudate around the mandrel and also in an axial direction by subjecting it to a force extending toward said die mouth, and said guide means including an extrudate divider for the mandrel adjacent said inlet port to guide the extrudate entering said port around and along the mandrel to uniformly distribute it therearound as it is flowing to said die mouth.

2. Apparatus according to claim 1 in which said guide means is in the form of a curved ridge surrounding the mandrel and being concavely tapered symmetrically around both halves of the mandrel with the concave curvature facing the die mouth.

3. Apparatus according to claim 2 in which the said ridge is tapered with its narrow end portion directed toward the die mouth.

4. Apparatus according to claim 1 in which said divider is of tapered contour with the broad end located adjacent the said inlet port and with the narrow end facing the die mouth.

5. Apparatus according to claim 4 in which said divider extends part way along the length of the mandrel and is symmetrically located with respect to the curvature of said guide means and with respect to said inlet port.

6. Apparatus according to claim 5 in which said divider is in the form of a pear-shaped boss formed on the surface of said mandrel.

7. Apparatus for making foamed plastic sheets comprising a die having an inlet port to receive molten foamable plastic extrudate under pressure, said die comprising a body member having a cylindrical bore, a cylindrical member in said bore in cylindrical spaced relation to the inner wall of said bore to define a tubular passage leading from said port, an adjustable gauging sleeve-mandrel surrounding said member and adjustably slidable along said passage, said sleeve, having at one end and adjacent to one side of said port a curved ridge, an extrudate divider on said sleeve in spaced relation to said ridge and closely adjacent said port on the opposite side thereof, said divider extending only part way along the length of said sleeve-mandrel and forming with said ridge a guide for the extrudate to distribute it uniformly around the length of said member.

8. A die for making foamed plastic sheets comprising a main body member having a cylindrical bore, a cylindrical member being spaced from the inner wall of said body member to define a tubular passage for extrudate, a port in said body member to receive foamable molten plastic under pressure, a gauging sleeve-mandrel surrounding said member and slidably adjustable therealong, said gauging sleeve-mandrel having a wall thickness less than the width of said tubular passage and being provided with an extrudate divider adjacent said port, inner and outer die lips defining an exit mouth for the extrudate leaving the die, manually adjustable means to adjust the position of said gauging sleeve-mandrel longitudinally of the die, other manual means for controlling the spacing between said die lips independently of the adjustment of said gauging sleeve-mandrel, said gauging sleeve-mandrel having an extrudate guiding ridge extending therearound and in communication with said port and cooperating with said divider to distribute the incoming extrudate uniformly around the sleeve-mandrel, said ridge being concavely curved around the sleeve-mandrel with the concavity of the curvature facing the die mouth.

9. Apparatus according to claim 8 in which individual controllable cooling means are provided for said inner and outer die lips.

10. A system for manufacturing foamed plastic sheets comprising an extruding machine for heating plastic pellets together with a nucleating material and a gas under pressure to form a molten foamable extrudate, a die connected to the outlet end of said machine said die having means to define a tubular extrudate space and an inlet port in communication with the outlet of said extruding machine, said die having a pair of inner and outer lips defining an annular die mouth, a gauging sleeve-mandrel adjustable along the length of said die and including an extrudate divider and an extrudate guiding ridge, means to adjust the position of said gauging sleeve-mandrel, separate means to adjust the spacing between said inner and outer lips, a forming block to receive the foamed extrudate emerging from said mouth and to form it into a tubular sheet while subjecting it to a predetermined cooling temperature gradient.

References Cited

UNITED STATES PATENTS

| | | |
|---|---|---|
| 2,239,408 | 4/1941 | Wallace. |
| 2,560,778 | 7/1951 | Richardson et al. ____ 18—14 X |
| 2,943,352 | 7/1960 | Van Riper _____ 18—13 |
| 3,079,636 | 3/1963 | Aykanian _____ 18—14 |
| 3,111,713 | 11/1963 | Kaplan _____ 18—14 |

FOREIGN PATENTS

| | | |
|---|---|---|
| 713,841 | 8/1954 | Great Britain. |
| 892,302 | 3/1962 | Great Britain. |
| 567,245 | 10/1957 | Italy. |

WILLIAM J. STEPHENSON, *Primary Examiner.*